(12) United States Patent
Lim et al.

(10) Patent No.: US 7,054,537 B2
(45) Date of Patent: May 30, 2006

(54) VARIABLE OPTICAL ATTENUATOR FOR OPTICAL COMMUNICATIONS

(75) Inventors: Tae-Sun Lim, Suwon (KR); Young-Joo Yee, Seongnam (KR); Hyouk Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/059,524

(22) Filed: Feb. 17, 2005

(65) Prior Publication Data

US 2005/0185914 A1    Aug. 25, 2005

(30) Foreign Application Priority Data

Feb. 20, 2004    (KR) .................... 10-2004-0011471

(51) Int. Cl.
*G02B 6/00*    (2006.01)
(52) U.S. Cl. .................... 385/140; 385/33; 385/34; 385/35
(58) Field of Classification Search .................. 385/14, 385/15, 33–36, 140, 147; 359/227–236
See application file for complete search history.

(56) References Cited

U.S. PATENT DOCUMENTS

2002/0097977 A1* 7/2002 Morimoto et al. .......... 385/140

FOREIGN PATENT DOCUMENTS

JP    2002-221676 A    8/2002

* cited by examiner

Primary Examiner—Phan Palmer
(74) Attorney, Agent, or Firm—Birch, Stewart, Kolasch & Birch, LLP

(57) ABSTRACT

A variable optical attenuator for optical communications comprises: a substrate on which a plurality of alignment grooves are patterned; an input optical fiber aligned in one of the alignment grooves and receiving an optical signal; a reflector formed on the substrate so as to move to change a path of an optical signal which has passed through the input optical fiber; an output optical fiber aligned in one of the alignment grooves and outputting an optical signal whose path has been changed; a first lens aligned in one of the alignment grooves between the input/output optical fibers and the reflector so as to collimate an optical signal in a direction perpendicular to the substrate; and a second lens patterned on the substrate between the input/output optical fibers and the reflector so as to collimate an optical signal in a direction horizontal to the substrate, thereby facilitating an assembly process, reducing an alignment error, and miniaturizing its entire size.

19 Claims, 5 Drawing Sheets

VARIABLE OPTICAL ATTENUATOR FOR OPTICAL COMMUNICATIONS

BACKGROUND OF THE INVENTION

1. Field of the Invention

The present invention relates to a variable optical attenuator for optical communications, and particularly, to a variable optical attenuator for optical communications used as an interface device of an optical communication network and configured to be easily manufactured at a reduced manufacturing cost.

2. Description of the Background Art

Recently, information-related technologies are being remarkably developed with development of high-speed communication technologies using an optical fiber that can transmit and receive a large amount of information. Particularly, the transfer speed of multimedia information including various kinds of data such as moving images, audio signals, character signals and the like increases, an interactive communication environment is established and the number of users explosively increases. Thus, a communication network using an existing copper line for transmission is not sufficient to cope with such development. For this reason, a communication network using an optical signal having a high carrier frequency is being considered as the alternative.

In the optical communication network using light as an information transfer signal, an optical connector module, instead of a logic integrated circuit used in the communication network using an existing copper transmission line, is used as an interface for connecting a user with a repeater or a common carrier.

The optical connector module, which is a data interface for such an optical communication network includes: a transmission line made of an optical fiber, an optical reception module used to receive an optical signal, an optical transmission module used to transmit an optical signal, and an optical repeater. However, the optical connector module requires precise processing and assembly, which makes its manufacturing cost expensive.

Also, the optical connector module should satisfy the following requirements: small power consumption, lightness and smallness for easy handling, and good mechanical/optical characteristics. However, it is not easy to manufacture an optical connector module that meets all the requirements.

Meanwhile, a variable optical attenuator, one of parts for optical fiber communication, is increasingly drawing attention. This is because each device is driven by a wide range of optical output from high level output signal, which is outputted from a transmitter, an amplifier or the like, to a low level signal inputted to a receiver. For example, in order to attenuate the optical output of a light receiving part, a fixed optical attenuator is used in a short distance optical fiber transport network. Also, a variable optical attenuator for controlling the size of an optical signal with respect to multi-channels in a WDM (wavelength-division-multiplex) optical network is in development.

As an optical switch including the optical attenuator, there are a bulk optomechanical switch, a liquid crystal switch, a lithium niobate switch, a thermal optical switch using a waveguide and the like. However, although there are various types of switches, there is a limit to the manufacturing of a switch which is ultralight and can maintain high mechanical/optical characteristics while consuming a small amount of power.

To overcome such limits, researches on a variable optical attenuator and various precision parts for optical fiber communication using a semiconductor manufacturing process and a micromachining technique are actively ongoing.

FIGS. 1 to 3 illustrate a conventional optical attenuator for optical communications using a microspherical lens. FIG. 1 is a perspective view illustrating a structure of the conventional variable optical attenuator, FIG. 2 is a perspective view illustrating a structure of a collimating lens system of FIG. 1, and FIG. 3 is a schematic view illustrating an operational principle of the collimating lens system of FIG. 2.

As shown, the conventional optical attenuator for optical communications includes: a first collimating lens system 10 collimating and transmitting an input optical signal 5a; a reflector 20 installed on the substrate so as to be rotated to change a direction of the optical signal 5b outputted from the first collimating lens system 10 by a certain angle ($\alpha$); and a second collimating lens system 30 installed on the substrate at a certain angle ($\alpha$) from the first collimating lens system 10 with respect to an optical signal 5b that is incident on the reflector 20, for collimating and outputting an optical signal 5c reflected by the reflector 20.

The first and second collimating lens systems 10 and 30 and the reflector 20 are installed in receiving grooves 41 and 42 patterned on a substrate 40 of a silicon material.

As shown in FIG. 2, the first collimating lens system 10 includes: an optical fiber 11 transmitting an optical signal 5a; and a microspherical lens 12 separated from one end of the optical fiber 11 at a predetermined distance so as to collimate the optical signal 5a having passed through the optical fiber 11. Likewise, the second collimating lens system 30 includes: a microspherical lens 32 for collimating an optical signal 5c whose direction has been changed by the reflector 20; and an optical fiber 31 separated from the microspherical lens 32 at a predetermined distance and transmitting the optical signal 5c which has been collimated while passing through the microspherical lens 32.

As shown in FIG. 3, an optical signal 5a', which is an optical signal 5a that has not reached the spherical lens 12, has not been collimated yet. While passing through the spherical lens 12, the optical signal 5a' is collimated in horizontal and perpendicular directions to the silicon substrate 40, thereby increasing an optical density of the optical signal 5. Therefore, the optical efficiency can be improved.

The operation of the conventional optical attenuator for the optical communications will now be described in detail.

The optical signal 5a is collimated in horizontal and vertical directions to the silicon substrate 40 while passing through the first collimating lens system 10, and the collimated optical signal 5b undergoes a change in its advancing direction by the reflector 20 by a predetermined angle of reflection. The optical signal 5c whose advancing direction has been changed by the reflector 20 penetrates the spherical lens 32 of the second collimating lens system 30 and the optical fiber 31 and then is outputted. Here, the reflector 20 is configured to be rotated to change the reflection angle ($\alpha$) minutely depending on its rotation. Also, the reflector 20 controls the optical signal such that only part of the reflected optical signal 5c is incident on the second collimating lens system 30. In such a manner, the intensity of the outputted optical signal 5d, namely, the quantity of light, is controlled.

However, in the conventional optical attenuator for optical communications, the first and second collimating lenses are installed on the substrate at a certain distance corresponding to a reflection angle, which may excessively increase its size. Thus, since the entire size of a system is increased, it is difficult for the system to satisfy the requirements of lightness and smallness.

Also, since the microspherical lens that is expensive and has a diameter of less than 1 mm is used to collimate an optical signal, a manufacturing cost is increased.

Furthermore, since a collimating lens system including the microspherical lens should be aligned on a silicon substrate after the silicon substrate is processed, an alignment error in assembly increasingly occurs.

SUMMARY OF THE INVENTION

Therefore, an object of the present invention is to provide a variable optical attenuator for optical communications used as an interface device of an optical communication network and configured to be easily manufactured at a reduced manufacturing cost.

To achieve these and other advantages and in accordance with the purpose of the present invention, as embodied and broadly described herein, there is provided a variable optical attenuator for optical communications comprising: a substrate on which a plurality of alignment grooves are patterned; an input optical fiber aligned in one of the alignment grooves and receiving an optical signal; a reflector formed on the substrate so as to move to change a path of an optical signal which has passed through the input optical fiber; an output optical fiber aligned in one of the alignment grooves and outputting an optical signal whose path has been changed; a first lens aligned in one of the alignment grooves between the input/output optical fibers and the reflector so as to collimate an optical signal in a direction perpendicular to the substrate; and a second lens patterned on the substrate between the input/output optical fibers and the reflector so as to collimate an optical signal in a direction horizontal to the substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
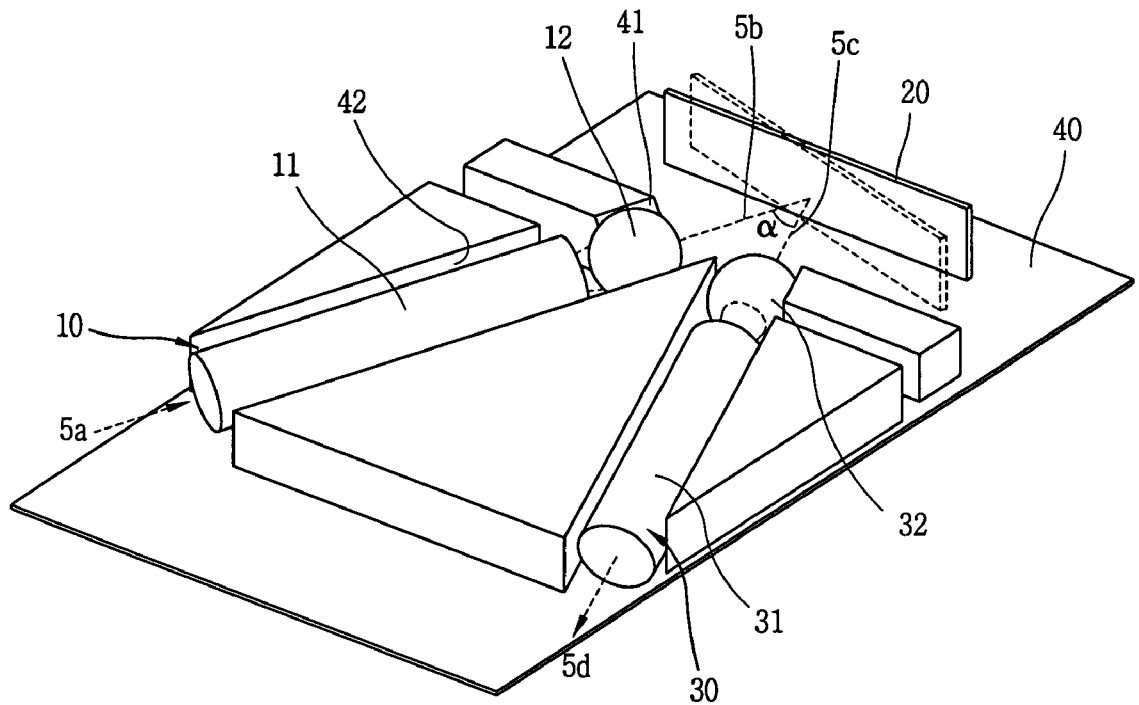
FIG. 1 is a perspective view illustrating a structure of the conventional variable optical attenuator.
Figure 2:
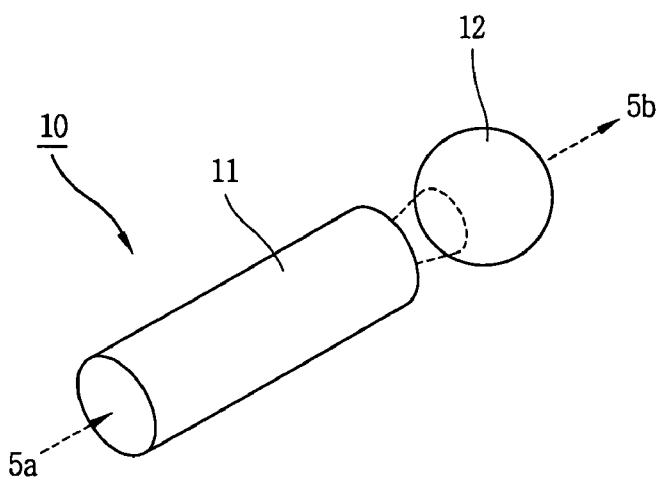
FIG. 2 is a perspective view illustrating a structure of a collimating lens system of FIG. 1.
Figure 3:
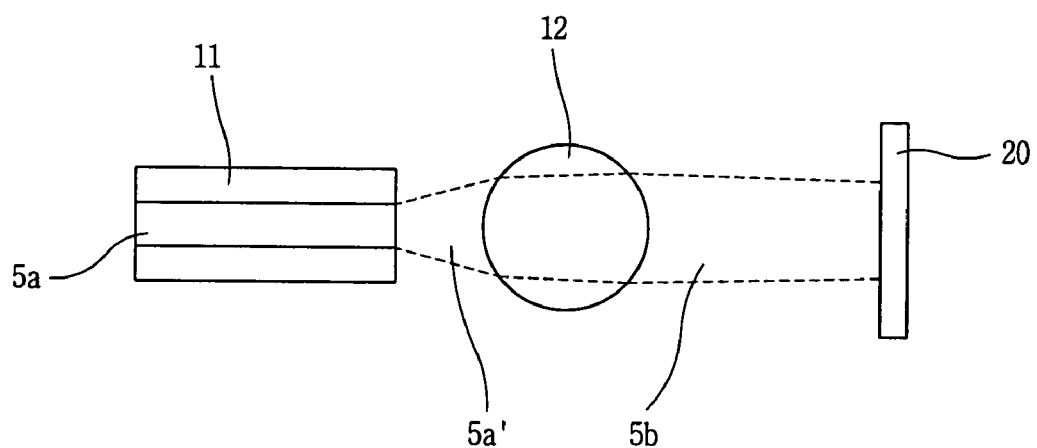
FIG. 3 is a schematic view illustrating an operational principle of the collimating lens system of FIG. 2.
Figure 4:
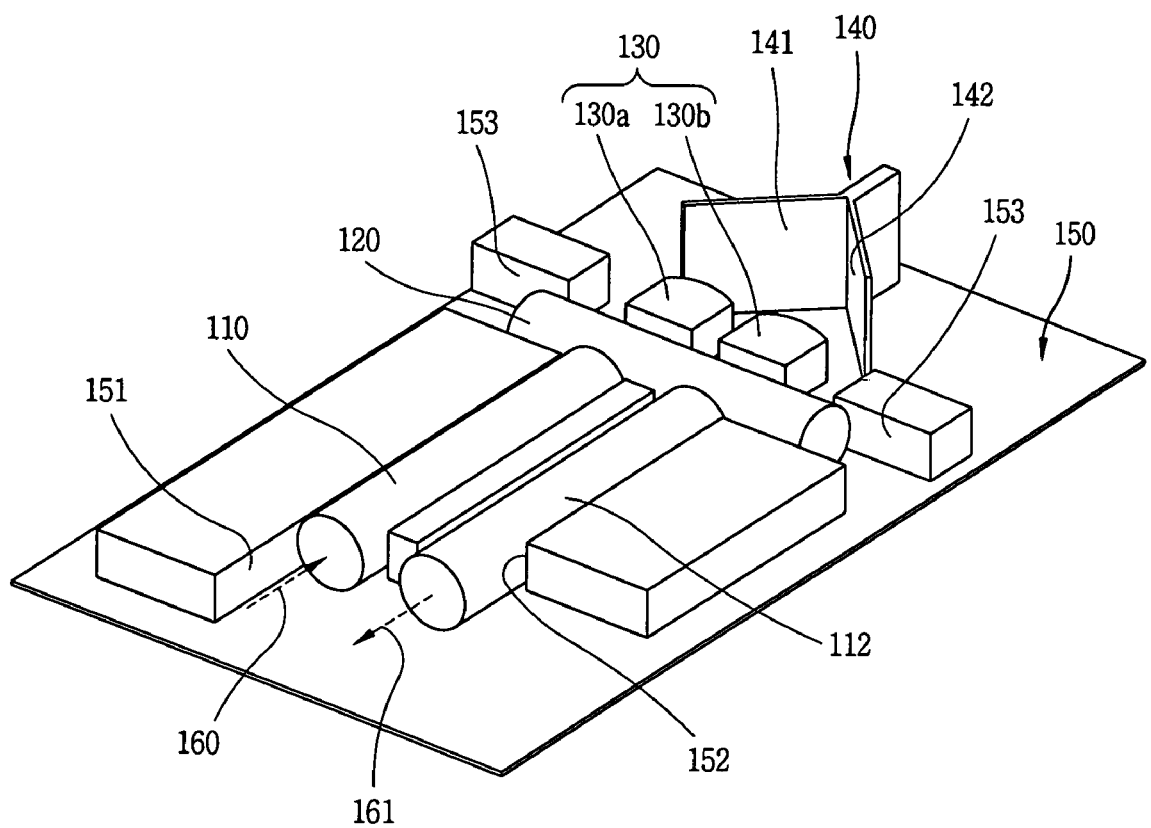
FIG. 4 is a perspective view illustrating a structure of a variable optical attenuator in accordance with a first embodiment of the present invention.
Figure 5:
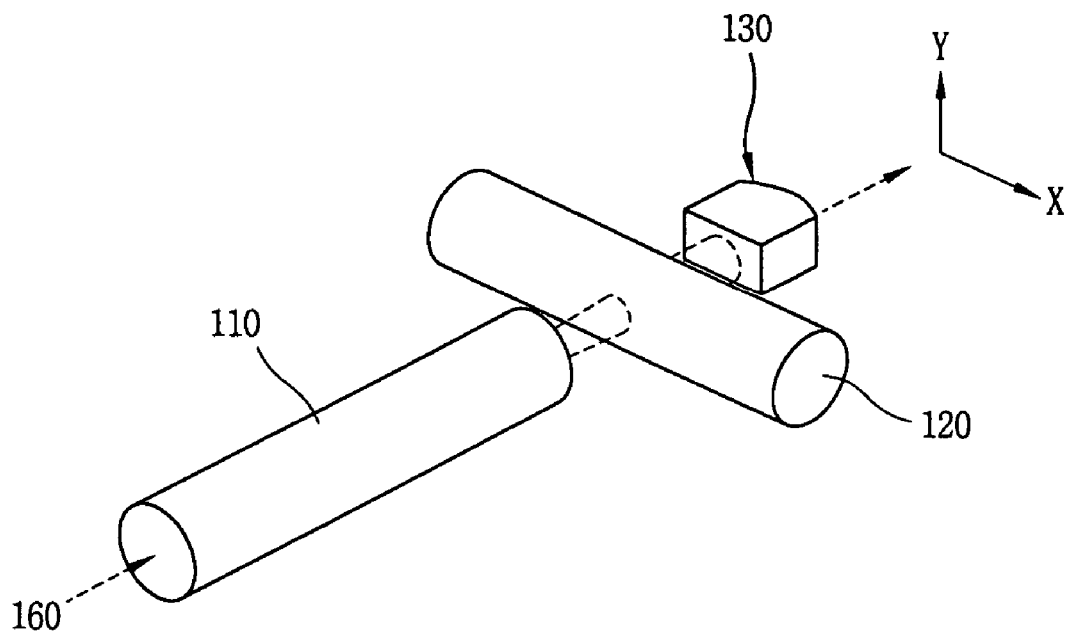
FIG. 5 is a perspective view illustrating a structure of a collimating system lens system of FIG. 4.
Figure 6:
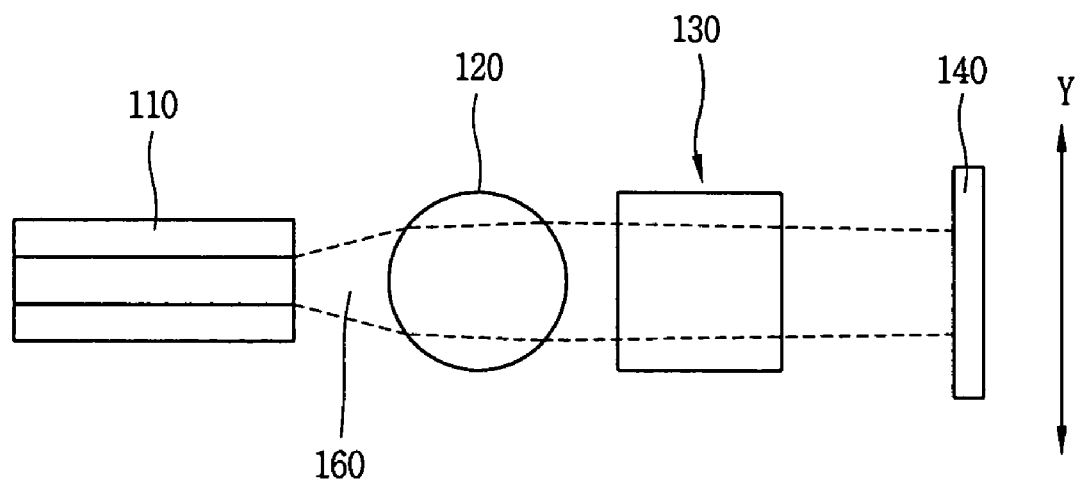
FIG. 6 is a side view illustrating an operational principle of the collimating lens system of FIG. 5.
Figure 7:
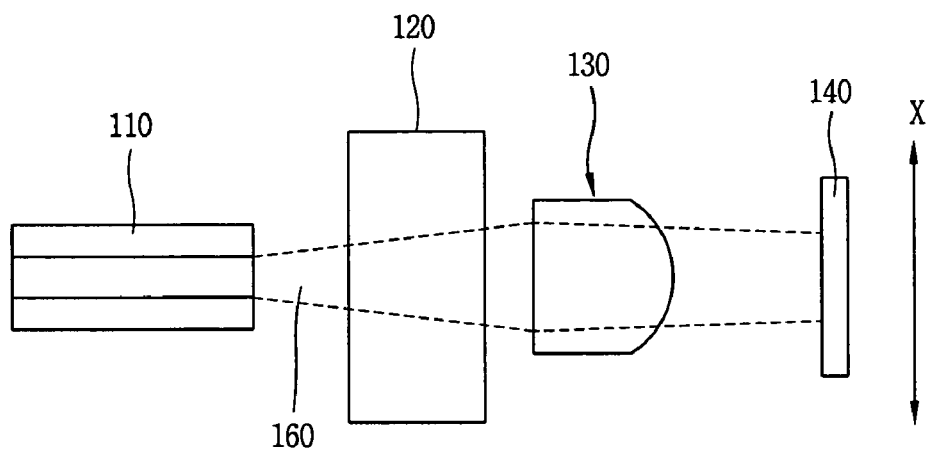
FIG. 7 is a plan view illustrating an operational principle of the collimating lens system of FIG. 5.
Figure 8:
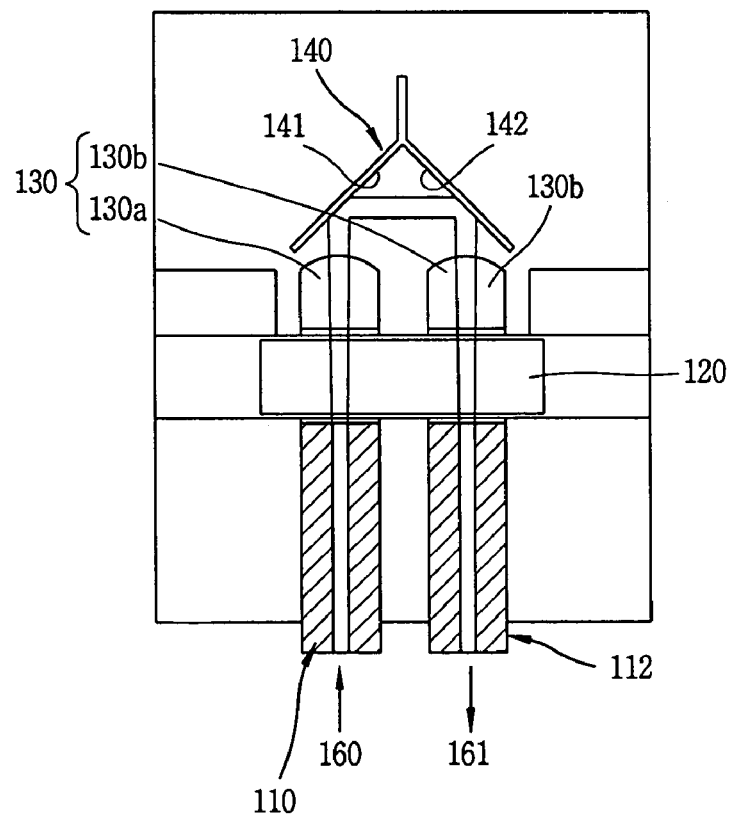
FIGS. 8 and 9 are schematic views illustrating an operational principle of the variable optical attenuator in accordance with the first embodiment of the present invention.
Figure 9:
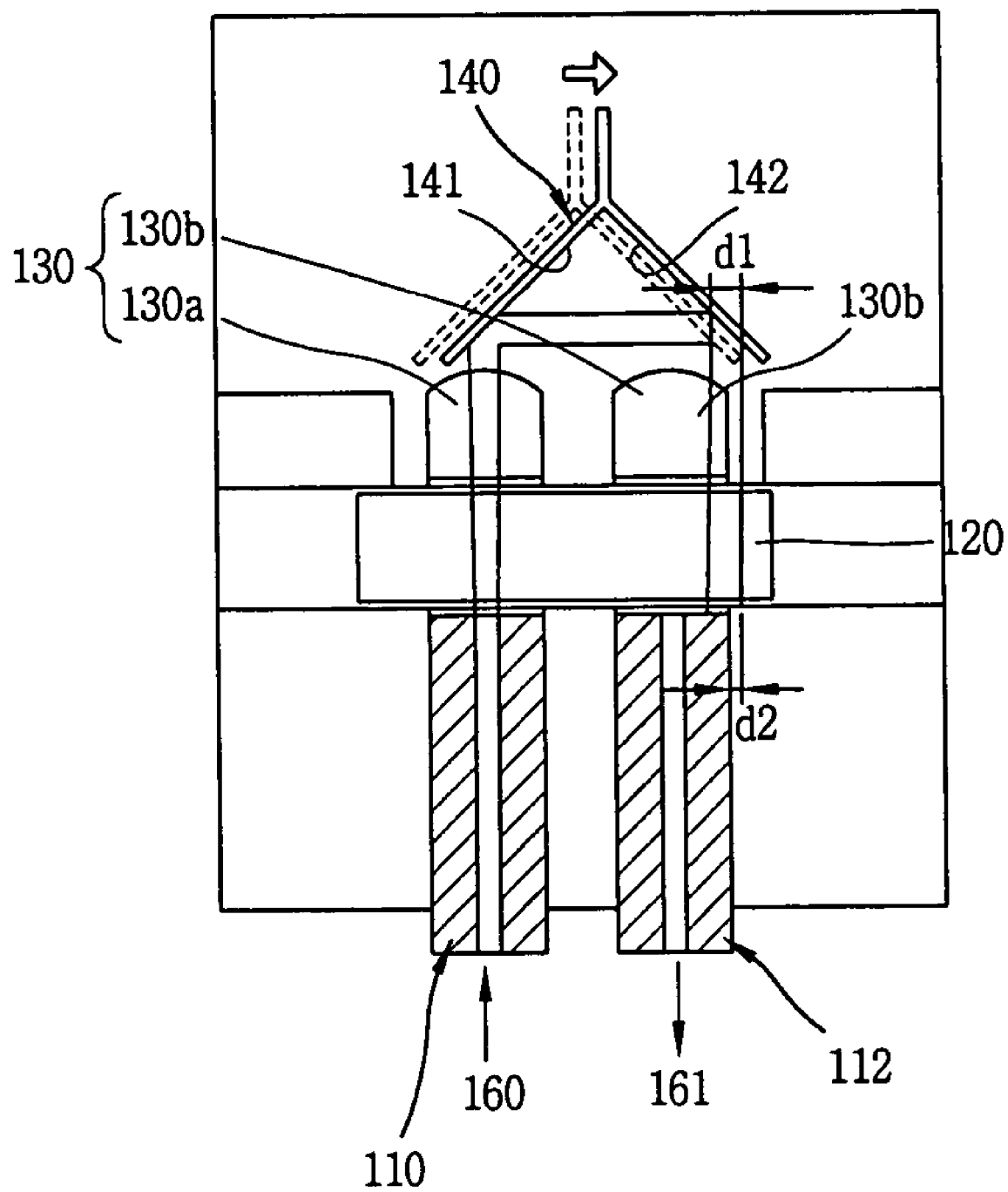

FIGS. 4 to 9 illustrate a variable optical attenuator for optical communications in accordance with the first embodiment of the present invention. FIG. 4 illustrates a structure of the variable optical attenuator in accordance with the first embodiment of the present invention, and FIG. 5 illustrates a structure of a collimating lens system of FIG. 4. Also, FIGS. 6 and 7 illustrate an operational principle of the collimating lens system, and FIGS. 8 and 9 illustrate an operational principle of the variable optical attenuator in accordance with the first embodiment of the present invention.

As shown, the variable optical attenuator for optical communications in accordance with the first embodiment of the present invention comprises: a substrate 150 on which a plurality of alignment grooves 151, 152 and 153 are patterned; an input optical fiber 110 aligned in one alignment groove 151 and receiving an optical signal 160; a reflector 140 formed on the substrate 150 so as to move to change a path of an optical signal 160 which has passed through the input optical fiber 110; an output optical fiber 112 aligned in one alignment groove 152 and outputting an optical signal 161, which is the optical signal 160 whose path has been changed; a first lens 120 aligned in one alignment groove 153 between the input/output optical fibers 110, 112 and the reflector 140 and collimating the optical signal in a direction (direction of the x-axis) perpendicular to the substrate 150; and a second lens 130 patterned on the substrate 150 between the input/output optical fibers 110, 112 and the reflector 140 so as to collimate the optical signal 160 in a direction (direction of the y-axis) horizontal to the substrate 150.

The substrate 150 is commonly made of a silicon material, and the alignment grooves 151, 152 and 153 are patterned on the substrate 150 by a micromachining method using a semiconductor process technology.

The input optical fiber 110 and the output optical fiber 120 are received in the alignment grooves 151 and 152 and aligned parallel to each other. The first lens 120 is aligned perpendicularly to a direction in which the input/output optical fibers 110 and 120 are aligned. At this time, the first lens 120 is aligned at a predetermined distance from one ends of the input/output optical fibers 110 and 120 so that the optical signal 160 is collimated in a perpendicular direction to the substrate 150 while passing through the first lens 120.

Such a first lens 120 is preferably formed as a cylindrical shape having a certain radius of curvature in a direction perpendicular to the substrate 150.

Since the first lens 120 has a pretty big size in comparison with the conventional spherical lens, the first lens 120 can be easily received in the patterned alignment groove 153 on the substrate 150 without being greatly affected by an alignment error.

Preferably, an optical fiber of a transparent material is used as the first lens 120.

Meanwhile, the second lens 130 formed between the first lens 120 and the reflector 140 is divided into an input optical lens 130a formed on the substrate 150 along an alignment axis of the input optical fiber 110 in order to collimate an optical signal, which has passed through the input optical fiber 110, in a direction horizontal to the substrate 150, and an output optical lens 130b formed on the substrate 150 along an alignment axis of the output optical fiber in order to collimate the optical signal 160 whose path has been changed by the reflector 140 in a direction horizontal to the substrate 150.

As for the second lens 130 including the two lenses 130a and 130b, one surface of each lens 130a, 130b has a certain radius of curvature in a direction horizontal to the substrate 150, so as to collimate the optical signal 160 in a direction horizontal to the substrate 150. Accordingly, the second lens 130 can effectively collimate the optical signal 160 together with the first lens 120.

Here, the functions and shapes of the input optical lens 130a and the output optical lens 130b are the same. Thus, the two lenses will be described as a second lens 130 without distinction between the two.

That is, when the optical signal 160 passes through the first lens 120, a perpendicular divergence angle of the optical signal 160 diverged in a direction perpendicular to the substrate 150 is reduced. When the optical signal 160 passes through the second lens 130, a horizontal divergence angle of the optical signal 160 diverged in a direction horizontal to the substrate is reduced.

Such a second lens 130 is preferably patterned simultaneously with the alignment grooves 151, 152 and 153 patterned on the substrate 150.

Namely, the second lens 130 and the alignment grooves 151, 152 and 153 can be formed on a silicon wafer in a very simple and easy manner through batch-processes using MEMS technology.

In more detail, the second lens 130 and the alignment grooves 151, 152 and 153 are easily formed by patterning a thick photoresist film formed on the substrate 150 through a photolithography process thereon. As another method, the second lens 40 and the alignment grooves 151, 152 and 153 can be easily formed by patterning a photosensitive polymer film formed on the substrate 150 through a photolithography process.

Namely, the second lens 130 is made of a polymer. To be sure, any material which can function as a lens can be used for the second lens if the material can be applied to the bath processes using MEMS technology.

Meanwhile, the reflector 140 that can move in a direction (direction of the x-axis) perpendicular to a direction in which the optical signal 160 advances from the input optical fiber 110 is formed on the substrate 150, so as to control the quantity (i.e., intensity) of optical signal to be outputted through the output optical fiber 112.

The reflector 140 has a first reflecting surface 141 reflecting an optical signal having passed through the input optical fiber 110 and changing a path of the optical signal; and a second reflecting surface 142 changing again the path of the optical signal which has been reflected by the first reflecting surface 141 so as to allow the optical signal to be outputted through the output optical signal 112.

Namely, the reflecting surfaces 141 and 142 of the reflector 140 are disposed, forming a 'V' shape, and preferably, an included angle between the first reflecting surface 141 and the second reflecting surface 142 is a right angle.

Meanwhile, the input optical signal is preferably parallel to the output optical signal 161 whose path has been changed through the first and second reflecting surfaces 141 and 142. That is, by forming such a reflector 140, the input optical fiber 110 and the output optical fiber 112 are aligned parallel to each other.

Also, the reflector 140 is driven on the substrate in a direction perpendicular to the direction in which the optical signal 160 advances by a unit (not shown) driven by an electrostatic force or an electromagnetic force, so as to control the intensity (i.e., the quantity) of the optical signal 160 transmitted as its path is changed from the input optical fiber 110 to the output optical fiber 112.

Here, the first reflecting surface 141 and the second reflecting surface 142 of the reflector 140 are formed integrally and are simultaneously movable so as to control the quantity of light of the output optical signal 161.

Meanwhile, even though not shown in the drawing, the reflecting surfaces 141 and 142 of the reflector 140 can be driven individually. For example, the first reflecting surface 141 and the second reflecting surface 142 of the reflector 140 are separately constructed, and only the second reflecting surface 142 moves on the substrate 150 in a direction perpendicular to a direction in which the input/output optical signals 160 and 162 advance, thereby controlling the output intensity of the optical signal 160.

Hereinafter, the operation of the variable optical attenuator for optical communications in accordance with the first embodiment of the present invention will now be described in detail.

An optical signal 160 passes through the input optical fiber 110 and then passes through the first lens 120 installed on the substrate 150 in a direction perpendicular to a direction in which the optical signal 161 advances. At this time, as shown in FIG. 6, the optical signal is collimated in a direction perpendicular to the substrate 150. Then, as shown in FIG. 7, the optical signal passes through the second lens 130, thereby being collimated in a direction horizontal to the substrate 150. Thus, the quantity of light introduced to the reflector 140 is increased, and therefore, the optical signal 160 is efficiently transferred to the reflector 140.

Here, as shown in FIGS. 8 and 9, the optical signal 160 having passed through the first lens 120 and the second lens 130 is reflected by the first reflecting surface 141 of the reflector 140 in a direction perpendicular to the path of the optical signal incident on the first reflecting surface 141, so that the path of the optical signal is changed toward the second reflecting surface 142. The optical signal 160 is reflected by the second reflecting surface 142, thereby advancing in a direction opposite but parallel to the advancing direction of the optical signal 160 being incident on the first reflecting surface 141.

At this time, as shown in FIG. 9, when the reflector 140 moves horizontally in a direction of the optical signal 160 reflected by the first reflecting surface 141, the optical signal 160 reflected by the reflector 140 is transmitted to the output optical fiber 112 as much as the quantity of light corresponding to d1–d2 so that the quantity of light is reduced by d2. Namely, the optical signal which has passed through the input optical fiber 110 and whose quantity of light corresponds to d1 undergoes a decrease in quantity of light corresponding to d2.

As so far described, unlike the conventional variable optical attenuator using a spherical lens as a collimating lens of an optical signal, the present invention uses a collimating lens system including a first lens collimating an optical signal in a direction perpendicular to a substrate; and a second lens made of a polymer material and patterned on the substrate by a semiconductor batch process and a micromachining technology simultaneously with an alignment groove structure of an optical fiber. Accordingly, since only the first lens which has a relatively big size is aligned in the alignment groove patterned on the substrate, the alignment process of a collimating lens system becomes very simple and an alignment error can be remarkably reduced. Accordingly, the variable optical attenuator in accordance with the present invention can be easily manufactured at a low cost as a small and light optical interface device which is used for an optical reception/transmission module of high frequency band and an optical communication networks.

Also, in the present invention, since a reflector provided with reflecting surfaces having a predetermined included angle is used, the input optical fiber and the output optical fiber can be aligned parallel to each other. Accordingly, integration of the optical fiber can be easily made, and thus the entire size of the variable optical attenuator can be effectively reduced. Accordingly, if the variable optical attenuators for optical communications in accordance with the present invention are connected in parallel, a multi-channel optical add/drop multiplexer (OADM) module can be miniaturized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A variable optical attenuator for optical communications comprising:
    a substrate on which a plurality of alignment grooves are patterned;
    an input optical fiber aligned in one of the alignment grooves and receiving an optical signal;
    a reflector formed on the substrate so as to move to change a path of an optical signal which has passed through the input optical fiber;
    an output optical fiber aligned in one of the alignment grooves and outputting an optical signal whose path has been changed;
    a first lens aligned in one of the alignment grooves between the input/output optical fibers and the reflector so as to collimate an optical signal in a direction perpendicular to the substrate; and
    a second lens patterned on the substrate between the input/output optical fibers and the reflector so as to collimate an optical signal in a direction horizontal to the substrate.

2. The attenuator of claim 1, wherein the reflector moves on the substrate in a direction perpendicular to the optical signal that is incident on the reflector, so as to reflect the incident optical signal, allowing the optical signal to advance parallel to the optical signal being incident on the reflector.

3. The attenuator of claim 2, wherein the reflector has two reflecting surfaces having a predetermined included angle to change a path of an optical signal that is incident on the reflector.

4. The attenuator of claim 3, wherein the reflecting surfaces of the reflector are integrally formed.

5. The attenuator of claim 3, wherein the reflecting surfaces of the reflector move individually.

6. The attenuator of claim 3, wherein the included angle between the reflecting surfaces is a right angle.

7. The attenuator of claim 2, wherein the output optical fiber is aligned parallel to the input optical fiber such that an optical signal reflected from the reflector is incident thereon.

8. The attenuator of claim 1, wherein the second lens is patterned simultaneously with the alignment grooves.

9. The attenuator of claim 8, wherein the second lens and the alignment grooves are formed by patterning a photosensitive polymer film formed on the substrate through a photolithography process.

10. The attenuator of claim 8, wherein the second lens is made of a polymer.

11. The attenuator of claim 8, wherein the second lens and the alignment grooves are formed by patterning a thick photoresist formed on the substrate through a photolithography process.

12. The attenuator of claim 1, wherein the first lens has a certain radius of curvature in a direction perpendicular to the substrate.

13. The attenuator of claim 12, wherein the first lens is formed as a cylindrical shape.

14. The attenuator of claim 1, wherein the second lens is divided into a lens for collimating an optical signal which has passed through the input optical fiber and a lens for collimating an optical signal whose path has been changed by the reflector.

15. The attenuator of claim 14, wherein each lens has a certain radius of curvature in a direction horizontal to the substrate.

16. The attenuator of claim 1, wherein the first lens is aligned perpendicular to an alignment direction of the input/output optical fibers.

17. The attenuator of claim 1, wherein the first lens is an optical fiber.

18. The attenuator of claim 1, wherein the input optical fiber and the output optical fiber are aligned parallel to the each other.

19. The attenuator of claim 1, wherein the substrate is made of a silicon material.

* * * * *